United States Patent
Bizet et al.

(10) Patent No.: US 10,717,890 B2
(45) Date of Patent: Jul. 21, 2020

(54) BINDER CONTAINING POLYVINYLIDENE FLUORIDE CAPABLE OF FIXING TO A METAL AND ASSOCIATED LITHIUM-ION BATTERY ELECTRODE

(71) Applicant: Arkema France, Colombes (FR)

(72) Inventors: Stéphane Bizet, Barc (FR); Anthony Bonnet, Saint-Laurent-de-Mure (FR); Jérôme G. Chauveau, Mesnil en Ouche (FR); Nadine Rivas, La Londe (FR)

(73) Assignee: ARKEMA FRANCE, Colombes (FR)

( * ) Notice: Subject to any disclaimer, the term of this patent is extended or adjusted under 35 U.S.C. 154(b) by 168 days.

(21) Appl. No.: 15/778,466

(22) PCT Filed: Nov. 17, 2016

(86) PCT No.: PCT/FR2016/052996
§ 371 (c)(1),
(2) Date: May 23, 2018

(87) PCT Pub. No.: WO2017/089683
PCT Pub. Date: Jun. 1, 2017

(65) Prior Publication Data
US 2018/0355206 A1    Dec. 13, 2018

(30) Foreign Application Priority Data

Nov. 24, 2015  (FR) ...................................... 15 61286

(51) Int. Cl.
| C09D 127/16 | (2006.01) |
| C09D 5/24 | (2006.01) |
| H01M 4/131 | (2010.01) |
| H01M 4/505 | (2010.01) |
| H01M 4/525 | (2010.01) |
| H01M 4/62 | (2006.01) |
| H01M 4/66 | (2006.01) |
| H01M 10/0525 | (2010.01) |
| C08K 3/22 | (2006.01) |

(52) U.S. Cl.
CPC ............. *C09D 127/16* (2013.01); *C09D 5/24* (2013.01); *H01M 4/131* (2013.01); *H01M 4/505* (2013.01); *H01M 4/525* (2013.01); *H01M 4/623* (2013.01); *H01M 4/625* (2013.01); *H01M 4/661* (2013.01); *H01M 10/0525* (2013.01); *C08K 2003/2203* (2013.01)

(58) Field of Classification Search
CPC ... C09D 127/16; C09D 5/24; H01M 10/0525; H01M 4/661; H01M 4/625; H01M 4/623; H01M 4/525; H01M 4/505; H01M 4/131; H01M 4/622; H01M 4/133; C08K 2003/2203; C08K 3/04; C08K 3/22; C08L 27/16; C08L 33/12
USPC ......................................................... 429/217
See application file for complete search history.

(56) References Cited

U.S. PATENT DOCUMENTS

| 5,922,493 A | 7/1999 | Humphrey, Jr. et al. |
| 6,228,533 B1 | 5/2001 | Ohashi et al. |
| 2013/0252077 A1 | 9/2013 | Iwasaki et al. |
| 2015/0062780 A1 | 3/2015 | Gadkaree et al. |
| 2015/0357648 A1 | 12/2015 | Sugimoto et al. |
| 2016/0079007 A1* | 3/2016 | Otsuka ............. H01M 10/0565 429/246 |

FOREIGN PATENT DOCUMENTS

| WO | WO 97/27260 | 7/1997 |
| WO | WO 9749777 | 12/1997 |
| WO | WO 9850479 | 11/1998 |
| WO | WO 2001/043214 | 6/2001 |

* cited by examiner

*Primary Examiner* — Gary D Harris
(74) *Attorney, Agent, or Firm* — Joanne Rossi

(57) ABSTRACT

The present invention relates to a binder which can be used in a lithium-ion battery, comprising at least one polyvinylidene fluoride and at least one acrylic copolymer including monomers having functional groups which have an affinity for metals or are capable of fixing to the metals. According to the invention, in a characteristic manner, said polyvinylidene fluoride is such that a solution of N-methyl-2-pyrrolidone containing 5 wt % of said polyvinylidene fluoride has a viscosity, measured at 23° C. with an imposed shear rate of 30 rpm, of 125 mPa·s to 1500 mPa·s.

16 Claims, No Drawings

BINDER CONTAINING POLYVINYLIDENE FLUORIDE CAPABLE OF FIXING TO A METAL AND ASSOCIATED LITHIUM-ION BATTERY ELECTRODE

This application claims benefit, under U.S.C. § 119 or § 365 of PCT Application Number PCT/FR2016/052996, filed Nov. 17, 2016, and French Patent Application Number FR1561286, filed Nov. 24, 2015, these documents being incorporated herein by reference.

The present invention relates to a binder which makes it possible to fix a material containing polyvinylidene fluoride to a metal and which can be used for a lithium-ion battery, and also to the associated electrode.

Lithium-ion batteries comprise a cathode which comprises a mixture of a lithium metal oxide, of a conductive filler (generally carbon black) and of a polymer binder. This mixture is deposited on a metal sheet, generally of aluminum. The polymer binder makes it possible to provide the cohesion of the deposited layer and the adhesion of the latter to the metal sheet.

The document WO 2001/043214 describes a cathode for a lithium-ion battery which comprises a binder based on fluoropolymer and a cohesion promoter. This fluoropolymer can be a homopolymer of vinylidene difluoride or a copolymer of vinylidene difluoride and of a monomer chosen from tetrafluoroethylene, hexafluoropropylene, trifluoroethylene and chlorotrifluoroethylene. The cohesion promoter is chosen from 5-sulfoisophthalic acid and its metal salts. This additive is a small molecule capable of migrating during the charging/discharging cycles. Furthermore, a doubt remains with regard to the impact of this type of additive on the electrochemical performance qualities.

The document WO 9850479 describes an electrode which comprises a binder containing a vinylidene fluoride homopolymer and a vinylidene fluoride copolymer, at least one of these polymers comprising functional groups capable of fixing to a metal.

The document WO 9732347 describes an electrode for a battery comprising an electrode-forming substrate which contains a binder which is used for fixing to the surface of the collector of the battery. This binder contains a PVDF (polyvinylidene fluoride) homopolymer or copolymer grafted with at least one acrylic polymer which comprises acrylic acid and/or methacrylic acid ester groups, the content by weight of this grafted acrylic polymer ranging from 0.1% to 20% of the binder.

The document WO 9749777 describes a binder which can be used for fixing to a metal which comprises a polyvinylidene fluoride polymer, an acrylic or methacrylic polymer comprising functional groups capable of fixing to a metal and an elastomer of acrylic or methacrylic type. This type of binder cannot be used in a lithium-ion battery electrode as, on contact with the electrolyte, the elastomer will swell and damage the electrode.

The document US 2013/252077 describes an electrode for a lithium-ion battery which operates with a nonaqueous electrolyte. This electrode comprises an active substance and a binder comprising a vinylidene fluoride polymer and an acrylic polymer. The content by weight of acrylic polymer varies from 40% to 90% and thus causes problems of deterioration of the electrode as a result of the swelling of the abovementioned acrylic polymer, in permanent contact with the electrolyte, in particular when the temperature in the electrode is higher than ambient temperature.

The document EP 2 953 193 describes a binder for a lithium-ion battery comprising a fluoropolymer and an acrylic polymer containing a nitrile group.

The document WO 97/27260 describes an electrode which comprises a collector made of metal coated with a layer comprising an active substance and a binder. This binder comprises at least two of the following three components: a vinylidene fluoride polymer, an acrylic or methacrylic polymer comprising functional groups capable of fixing to the metal and a vinylidene fluoride copolymer. When the binder comprises only the vinylidene fluoride polymer and the acrylic or methacrylic polymer, the latter is in a proportion ranging from 0.5% to 20% by weight of the total weight of the binder. The vinylidene fluoride copolymers used in the examples of this document are characterized by their flow rate by weight measured at 230° C. It turns out that, in practice, the weight of binder used has to be sizeable in order to obtain good cohesion of the active layer and good adhesion of the latter to the metal collector. Furthermore, swelling of the cathode in contact with the electrolyte is also observed. The vinylidene fluoride copolymers considered in this document are Kynar® 500 and Kynar® 301 F. These copolymers exhibit a melt flow index (MFR) measured at 1.2 g/10 minutes under 12.5 kg or 4 g/10 minutes under 21.6 kg. A solution of each of these copolymers at a concentration of 5% by weight in N-methyl-2-pyrrolidone exhibits a viscosity of 75 mPa·s at 23° C. It turns out that such viscosity values are not suited to use of such a binder in a lithium-ion battery at a content of less than 5% by weight in the substrate layer covering the metal collector of the battery.

Furthermore, it is known to use, as binder for lithium battery electrodes, a vinylidene fluoride homopolymer of high molecular weight, a 5% solution of which in N-methyl-2-pyrrolidone exhibits a viscosity, measured with a controlled shear rate of 30 revolutions/min, of greater than 100 mPa. This binder has the merit of causing only a limited swelling and of exhibiting only a low content of extractables in the electrolyte, that is to say that, during the use of the electrode, a small amount of products originating from the binder migrates into the electrolyte. It provides good adhesion as a result of the high molecular weight of the abovementioned PVDF homopolymer. On the other hand, as this same polymer has a high molecular weight, it is thus very viscous and it is consequently difficult to spread, over the metal collector, the paste formed by the mixture of this binder with the active substance of the electrode.

A first aim of the present invention is to provide a novel polymeric binder which makes it possible to fix a layer of PVDF-containing material to metal.

Another aim of the present invention is to provide a binder as mentioned above which confers good adhesion between the metal and the layer of PVDF-containing material.

Another aim of the invention is to provide a binder which, when it is used in a lithium-ion battery electrode, brings about limited swelling and a limited amount of compounds passing into the electrolyte.

Another aim of the present invention is to provide a binder which, in the film form, brings about a swelling not exceeding 30% by volume after 24 h of immersion at 60° C. in an ethyl carbonate/dimethyl carbonate/diethyl carbonate mixture having a 1/1/1 composition by weight.

Another aim of the present invention is to provide a binder which makes it possible to easily spread the active substance over the metal collector and thus facilitates the manufacture of an electrode for a lithium-ion battery.

Another aim of the invention is to provide a binder which, as a mixture with the active filler (this mixture commonly being known as "slurry"), can keep and exhibits a satisfactory "pot life" compatible with the times required by the process for the manufacture of the battery electrodes.

Another aim of the invention is to provide a binder which comprises a reduced content of organic solvent.

Another aim of the present invention is to provide an electrode for a lithium-ion battery, the active substance layer of which does not become detached from the collector and/or does not swell.

Another aim of the present invention is to provide an electrode which comprises a relatively low content by weight of binder in order to avoid the abovementioned problems of swelling and/or to make it possible to increase the content of active filler in the cathode in order to maximize the capacity of the batteries.

The present invention relates to a binder which can be used in a lithium-ion battery and which comprises at least one vinylidene fluoride polymer and at least one acrylic copolymer comprising monomers bearing functional groups exhibiting an affinity for metals or which are capable of becoming fixed to metals. Said acrylic copolymer is a copolymer of methyl methacrylate and methacrylic acid.

Characteristically, according to the invention, said vinylidene fluoride polymer is such that a solution of N-methyl-2-pyrrolidone containing 5% by weight of said vinylidene fluoride polymer exhibits a viscosity, measured with a controlled shear rate of 30 revolutions/min, equal to or greater than 125 mPa·s, preferably greater than 300 mPa·s, and less than 1500 mPa·s and preferably less than 1200 mPa·s.

This is because the Applicant Company has found that a binder as mentioned above makes it possible to obtain good adhesion of the active substance to a metal sheet, in particular to an aluminum sheet.

The presence of the acrylic copolymer facilies the application of the active substance during the manufacture of the electrode, as a result of the decrease in the viscosity of the binder/active substance mixture.

The binder according to the invention/active filler mixture exhibits a satisfactory pot life ranging from 1 hour to 24 hours and more particularly of the order of approximately ten hours.

Furthermore, the abovementioned binder causes only reduced swelling during the use thereof. In particular, the Applicant Company has found that, in the case of a binder film, the swelling does not exceed 30% by volume after 24 h of immersion at 60° C. in an ethyl carbonate/dimethyl carbonate/diethyl carbonate mixture having a 1/1/1 composition by weight.

The Applicant Company has also demonstrated that the content of compounds passing from the active substance into the electrolyte is reduced as a result in particular of the low amount of binder. In particular, the binder of the invention makes it possible to obtain a content of compounds passing from the active substance into the electrolyte (also known as extractables) of the order of 2%.

The Applicant Company has also demonstrated that it is possible to obtain good adhesion with a limited amount of binder which limits the swelling and also the amount of compounds passing into the electrolyte.

Furthermore, as a result of the decrease in the viscosity of the binder and thus of the binder/active substance mixture, the amount of organic solvent which has to be used in the manufacture of an electrode is reduced; the use of the binder according to the invention is thus more ecological.

The binder of the invention does not contain elastomeric polymer or elastomeric copolymer, in particular elastomeric (co)polymer of acrylic type, and the polymer of acrylic type is not an elastomer.

The type of vinylidene fluoride polymer mentioned above exhibits a molar weight of the order of a million grams and is already used as binder for lithium-ion batteries. Its mixture with an acrylic copolymer makes it possible to reduce the viscosity of the binder and thus that of the paste which is used to manufacture a lithium-ion battery electrode; it is thus easier to manufacture the electrode. Nevertheless, it was not obvious that the addition of the acrylic polymer, which is admittedly functionalized but with a molar mass far lower than that of PVDF, would very significantly increase the adhesion. This is because it is known to a person skilled in the art that the higher the molar mass of the binder, the more satisfactory the adhesion of the latter to the metal plate, which also improves the cohesion of the electrode comprising this binder.

Furthermore, the Applicant Company has also demonstrated that it is possible to manufacture electrodes for lithium-ion batteries which contain a reduced amount of binder, which makes it possible to increase the content of active filler in the cathode and to thus increase the charge capacity of the latter.

Preferably, the vinylidene fluoride polymer is such that the viscosity of said solution of N-methyl-2-pyrrolidone containing 5% by weight of said vinylidene fluoride polymer, measured at 23° C. with a controlled shear rate of 30 revolutions/min, is equal to or greater than 125 mPa·s and preferably equal to or greater than 300 mPa·s and preferably equal to or greater than 700 mPa·s and less than 1500 mPa·s and preferably less than 1200 mPa·s.

According to a specific embodiment, the vinylidene fluoride polymer is such that the viscosity of said solution of N-methyl-2-pyrrolidone containing 5% by weight of said vinylidene fluoride polymer and measured at 23° C. with a controlled shear rate of 30 revolutions/min is equal to 150 mPa·s.

According to another embodiment, the vinylidene fluoride polymer is such that the viscosity of said solution of N-methyl-2-pyrrolidone containing 5% by weight of said vinylidene fluoride polymer and measured at 23° C. with a controlled shear rate of 30 revolutions/min is equal to 700 mPa·s.

The functional groups capable of becoming fixed to metals or exhibiting an affinity for the latter are well known to a person skilled in the art. They can concern, for example, at least one type of group chosen from the following groups: carboxyl, carboxylic anhydride, epoxy, mercapto, sulfide, phenolic and ester. Advantageously, the acrylic copolymer comprises monomers comprising methacrylic acid functional groups and preferably only methacrylic acid functional groups.

The acrylic copolymer is not limited according to the invention. The term "acrylic copolymer" denotes any copolymer of following formula:

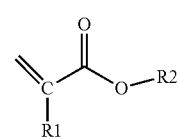

in which R1 is a hydrogen atom or an alkyl group, preferably a methyl, and R2 is an optionally substituted alkyl group.

The acrylic copolymer or the mixture of acrylic (co) polymers is not an elastomer, that is to say that it does not exhibit a glass transition temperature of less than 20° C.

Advantageously, the acrylic copolymer contains 10 mol % of monomers bearing functional groups exhibiting an affinity for metals or capable of becoming fixed to metals and in particular 10 mol % of monomers bearing methacrylic acid groups. The Applicant Company has demonstrated that such a copolymer would confer good adhesion on the material containing it and deposited on a metal sheet.

Advantageously, the binder contains, by weight, a content of acrylic copolymer of equal to or greater than 0.1% and of equal to or less than 25%, in particular of less than or equal to 20% and in particular of less than 10%. In particular, the binder contains a content of acrylic copolymer of equal to or greater than 2.5% and of equal to or less than 25%, preferably of equal to or less than 20% and in particular of equal to or less than 10%.

The present invention also relates to an electrode for a lithium-ion battery of the type comprising a metal collector, at least one face of which is covered with a layer of substrate containing an active substance and a binder which characteristically comprises the binder according to the invention or consists of the binder according to the invention.

The active substance which can be used for the formation of the anode or of the cathode is well known to a person skilled in the art.

Advantageously, said substrate contains, by weight, a content of said binder of equal to or greater than 1% and of equal to or less than 5% and in particular of equal to 3%. The Applicant Company has demonstrated that these low contents of binder make it possible to obtain good cohesion of the substrate and good adhesion of the latter to the metal, in particular aluminum.

The electrode can be a cathode and, in this case, the substrate can contain, as active substance, a lithium metal oxide and optionally carbon black.

The electrode can also be an anode and, in this case, said substrate can contain, as active substance, at least one ingredient chosen from coke, carbon black, graphite, activated carbon and carbon fibers.

Throughout the present patent application, the viscosity is measured using a Brookfield rotary viscometer comprising a spindle of SC4-34 type.

The present invention, its characteristics and the various advantages which it provides will become more clearly apparent on reading the examples which follow and which are provided as explanatory and nonlimiting examples.

EXAMPLES

Products Used for the Composition of the Binders
  PVDF 1: Vinylidene fluoride homopolymer characterized by a melt viscosity, measured according to ASTM D3835, of between 4450 Pa·s and 5450 Pa·s at 230° C. and 100 $s^{-1}$.
  PVDF 2: Vinylidene fluoride homopolymer characterized by a melt viscosity, measured according to ASTM D3835, of between 3400 Pa·s and 4000 Pa·s at 230° C. and 100 $s^{-1}$.
  PVDF 3: Vinylidene fluoride homopolymer characterized by a melt viscosity, measured according to ASTM D3835, of between 3000 Pa·s and 3300 Pa·s at 230° C. and 100 $s^{-1}$.
  Kynar®HSV900/Kynar®720 PVDF mixture in proportions by weight of 1:1 characterized by a melt viscosity, measured according to ASTM D3835 at 232° C. and 100 $s^{-1}$, of 3800 Pa·s.
  CMM: Copolymer of methyl methacrylate and methacrylic acid. This copolymer contains 10 mol % of methacrylic acid. It has an intrinsic viscosity of 27 $cm^3/g$.
  nonfunctionalized PMMA: Acrylic polymer based on methyl methacrylate which has an intrinsic viscosity of 46 $cm^3/g$. This polymer does not contain functionalized comonomer bearing carboxyl functional groups.

Compositions of the Binders

The different binder compositions studied are collated in table I below.

TABLE I

| | PVDF | Type of acrylic polymer | % by weight of PVDF | % by weight of acrylic polymer |
|---|---|---|---|---|
| Example 1 | PVDF 1 | CMM | 80 | 20 |
| Example 2 | PVDF 1 | CMM | 90 | 10 |
| Example 3 | PVDF 1 | CMM | 97.5 | 2.5 |
| Comparative example 1 | PVDF 1 | — | 100 | 0 |
| Comparative example 2 | PVDF 2 | — | 100 | 0 |
| Comparative example 3 | PVDF 3 | — | 100 | 0 |
| Comparative example 4 | PVDF 1 | nonfunctionalized PMMA | 90 | 10 |

Measurement of the Viscosity of Solutions of Binders in N-methyl-2-pyrrolidone

The viscosity was measured of solutions of N-methyl-2-pyrrolidone (NMP) respectively containing:
  5% by weight of PVDF 1 alone (comparative example 1 of table I)
  5% by weight of PVDF 2 alone (comparative example 2 of table I)
  5% by weight of PVDF 3 alone (comparative example 3 of table I)
  5% by weight of a Kynar® HSV900/Kynar® 720 PVDF mixture;
  5% by weight of a mixture of PVDF 1 and CMM, this consisting of 90% by weight of PVDF 1 and 10% by weight of CMM (example 2 of table I); and
  5% by weight of a mixture of PVDF 1 and CMM, this consisting of 97.5% by weight of PVDF 1 and 2.5% by weight of CMM (example 3 of table I).

The viscosity of each of the abovementioned solutions was measured at 23° C. using a Brookfield DV-II Pro viscometer equipped with a rotor of SC4-34 type with a rotational speed of the spindle controlled at 30 revolutions per minute.

The results obtained appear in table II below, which also collates the different binder compositions. Table II shows that the addition of an acrylic copolymer bearing methacrylic acid functional groups to a PVDF polymer makes it possible to reduce the viscosity of the PVDF/acrylic polymer mixture in comparison with the PVDF alone. This reduced viscosity makes it possible to more easily spread the mixture which forms the substrate containing the active substance of the electrode. Moreover, the viscosity of a 5% solution in N-methyl-2-pyrrolidone of a Kynar® HSV900/Kynar® 720 PVDF mixture as disclosed in the document EP 2 953 193 is 80 mPa·s.

TABLE II

| | Solution viscosity (mPa · s) |
|---|---|
| Example 2 | 450 |
| Example 3 | 620 |
| Comparative example 1 | 700 |
| Comparative example 2 | 150 |
| Comparative example 3 | 75 |
| Kynar® HSV900/Kynar® HS 720 PVDF mixture | 80 |

Preparation of Cathodes

In addition to the polymeric binders described above, the following products were used for the preparation of cathodes:
  lithium metal oxide LiNMC 1:1:1, sold by Umicore under the name of MX10,
  carbon black Super P Li, sold by Timcal.

As regards the polymeric binder, the same compositions as those appearing in table I are used.

A cathode was manufactured by following the following stages:
  a 5% by weight solution of polymeric binder in N-methyl-2-pyrrolidone is prepared until the polymeric binder has completely dissolved. Super P Li carbon black is then added to this solution. The solution is mixed using a mechanical stirrer. The lithium metal oxide LiNMC MX10 is then added. A paste is obtained which contains, by weight, 94 parts of LiNMC, 3 parts of carbon black and 3 parts of binder per 100 parts of the LiNMC/carbon black/binder mixture. The paste obtained is deposited on an aluminum sheet so as to have a wet thickness of 350 µm. The NMP is then evaporated by heating the coated sheet at 90° C. for 15 minutes and then at 150° C. for 30 minutes. A coating having a thickness of 110±15 µm is thus obtained. It is found that the paste formed with the binders of examples 1 to 3 cited in table I is easier to spread over the aluminum sheet.

Measurement of the Adhesion

The adhesion between the layer formed of the LiNMC/carbon black/binder mixture and the aluminum sheet is subsequently measured. To do this, a strip with a width of 25 mm is cut out. This strip is subsequently adhesively bonded to a stiff aluminum plate using a double-sided adhesive, the adhesive being deposited on the side of the LiNMC/carbon black/binder coating. The peel test is carried out using a dynamometer from MTS Systems of Synergie 200H type by fixing, in one jaw, the stiff aluminum plate and, in the other jaw, the flexible aluminum sheet on which the deposition was carried out. In this configuration, the peel angle is 180° C. The rate of displacement of the jaws is set at 100 mm/min. The results of the adhesion tests for the binder examples appearing in table I are collated in table III which follows. Table III shows that an improved adhesion is obtained with the addition to a vinylidene fluoride polymer of an acrylic copolymer containing functional groups exhibiting an affinity for metals or capable of becoming fixed to metals. It also shows that the improvement in the adhesion is due, at least in part, to the abovementioned functional groups. Finally, the results of Table III show that the proportion of acrylic copolymer as mentioned above can range at least up to 20% by weight of the binder and that the higher this proportion, the better the adhesion. Nevertheless, a reduced improvement in the adhesion, with respect to the increase in the amount of acrylic copolymer as mentioned above, is found when the proportion by weight of this acrylic polymer reaches 10%.

TABLE III

| | Peel force (N/25 mm) |
|---|---|
| Example 1 | 0.85 ± 0.03 |
| Example 2 | 0.80 ± 0.07 |
| Example 3 | 0.65 ± 0.05 |
| Comparative example 1 | 0.4 ± 0.05 |
| Comparative example 2 | 0.25 ± 0.03 |
| Comparative example 3 | 0.1 ± 0.03 |
| Comparative example 4 | 0.45 ± 0.03 |

The adhesive properties of a Kynarx HSV900/Kynarx 720 PVDF mixture as disclosed in the document EP 2 953 193 were also measured, as shown in table IV below:

TABLE IV

| | Peel force (N/25 mm) |
|---|---|
| PVDF 2 | 0.25 ± 0.03 |
| Kynar® HSV900/Kynar® 720 1:1 | 0.15 ± 0.02 |
| PVDF 2 + 10% CMM | 0.4 ± 0.02 |
| Kynar® HSV900/Kynar® 720 1:1 + 10% CMM | 0.2 ± 0.05 |

The results obtained show that the Kynarx HSV900/Kynarx 720 PVDF mixture does not make it possible to obtain adhesive properties sufficient for the application as binder for a lithium-ion battery.

Measurement of the Swelling in the Electrolyte and Content of Compounds Passing into the Electrolyte (Extractables)

The first stage for the measurement of the uptake in weight of the binder in the electrolyte consists in preparing a binder-free film. For this, a 5% by weight solution of polymeric binder in N-methyl-2-pyrrolidone is prepared until the polymeric binder has completely dissolved. An amount of solution is poured into a glass petri dish so as to have approximately 20 milligrams of solution per square centimeter. The solvent is subsequently evaporated by placing the petri dish in an oven at 120° C. overnight. A dry film of binder is thus obtained. Ten square centimeters are cut out. The sample is subsequently weighed. Its weight is denoted $W_0$.

Subsequently, the sample is immersed at 60° C. for 24 hours in a test tube containing the electrolyte consisting of an ethyl carbonate/dimethyl carbonate/diethyl carbonate mixture having a 1/1/1 composition by weight. On conclusion of the 24 hours, the film is removed from the test tube and given a cursory wipe in order to remove the surface electrolyte drops. It is subsequently weighed. This weight is denoted $W_1$.

Subsequently, the sample is immersed in dimethyl carbonate at ambient temperature for 2 hours. It is then dried in an oven at 120° C. for 2 hours. On conclusion of this stage, the sample is weighed. Its weight is denoted $W_2$.

The degree of swelling or uptake in weight is calculated according to the following formula:

$$\frac{W_1 - W_0}{W_0}$$

The content of extractables (or content of compounds passing from the binder into the electrolyte) is calculated according to the following formula:

$$\frac{W_0 - W_2}{W_0}$$

This protocol was applied to the composition of example 2. We obtained an increase in weight of 23% and a content of extractables of 2%.

The invention claimed is:

1. A binder for a lithium-ion battery comprising at least one vinylidene fluoride polymer and at least one acrylic copolymer, said acrylic copolymer comprising monomers comprising functional groups exhibiting an affinity for metals or which are capable of becoming fixed to metals, characterized in that said acrylic copolymer comprises monomers including at least one type of functional group chosen from among the following groups: carboxyl, carboxylic acid anhydride, epoxy, mercapto, sulfide and phenolic and wherein a 5% by weight solution of said vinylidene fluoride polymer in N-methyl-2-pyrrolidone exhibits a viscosity, measured at 23° C. with a controlled shear rate of 30 revolutions/min, equal to or greater than 125 millipascal-seconds, and less than 1500 millipascal-seconds.

2. The binder as claimed in claim 1, wherein said vinylidene fluoride polymer is such that said viscosity of said solution of N-methyl-2-pyrrolidone containing 5% by weight of said vinylidene fluoride polymer is about 150 millipascal-seconds or about 700 millipascal-seconds.

3. The binder as claimed in claim 1, wherein said acrylic copolymer comprises monomers comprising at least one type of functional group chosen from the following groups: carboxyl, carboxylic anhydride, epoxy, mercapto, sulfide, phenolic and ester.

4. The binder as claimed in claim 1, wherein said acrylic copolymer contains 10 mol % of monomers bearing functional groups exhibiting an affinity for metals or capable of becoming fixed to metals and in particular 10 mol % of methacrylic acid groups.

5. The binder as claimed in claim 1, wherein said binder contains, by weight, a content of acrylic copolymer equal to or greater than 0.1% and equal to or less than 25%.

6. An electrode for a lithium-ion battery of the type comprising a metal collector, at least one face of which is covered with a layer of substrate containing an active substance and a binder, characterized in that wherein said binder is the binder of claim 1.

7. The electrode as claimed in claim 6, wherein said substrate contains, by weight, a content of said binder of equal to or greater than 1% and of equal to or less than 5% and in particular equal to 3%.

8. The electrode as claimed in claim 6, wherein said substrate contains, as active substance, a lithium metal oxide and optionally carbon black.

9. The electrode as claimed in claim 6, wherein said substrate contains, as active substance, at least one ingredient chosen from coke, carbon black, graphite, activated carbon and carbon fibers.

10. The electrode as claimed in claim 1, wherein said solution of N-methyl-2-pyrrolidone containing 5% by weight of said vinylidene fluoride polymer exhibits a viscosity, measured at 23° C. with a controlled shear rate of 30 revolutions/min, is equal to or greater than 300 millipascal-seconds.

11. The electrode as claimed in claim 1, wherein said solution of N-methyl-2-pyrrolidone containing 5% by weight of said vinylidene fluoride polymer exhibits a viscosity, measured at 23° C. with a controlled shear rate of 30 revolutions/min, is equal to or greater than 700 millipascal-seconds, and less than 1200 millipascal-seconds.

12. The binder as claimed in claim 5 wherein said binder contains, by weight, a content of acrylic copolymer equal to or less than 20%.

13. The binder as claimed in claim 12 wherein said binder contains, by weight, a content of acrylic copolymer equal to or less than 10%.

14. The electrode as claimed in claim 7, wherein said substrate contains, by weight, a content of said binder equal to or greater than 1% and of equal to or less than 3%.

15. The binder as claimed in claim 1, wherein the 5% by weight solution of said vinylidene fluoride polymer in N-methyl-2-pyrrolidone exhibits a viscosity, measured at 23° C. with a controlled shear rate of 30 revolutions/min, equal to or greater than 300 millipascal-seconds, and less than 1200 millipascal-seconds.

16. The binder as claimed in claim 1, wherein said acrylic copolymer is a copolymer of methyl methacrylate and methacrylic acid.

\* \* \* \* \*